Dec. 17, 1935.   J. BARON   2,024,499
BICYCLE PEDAL
Filed April 12, 1934   2 Sheets-Sheet 1
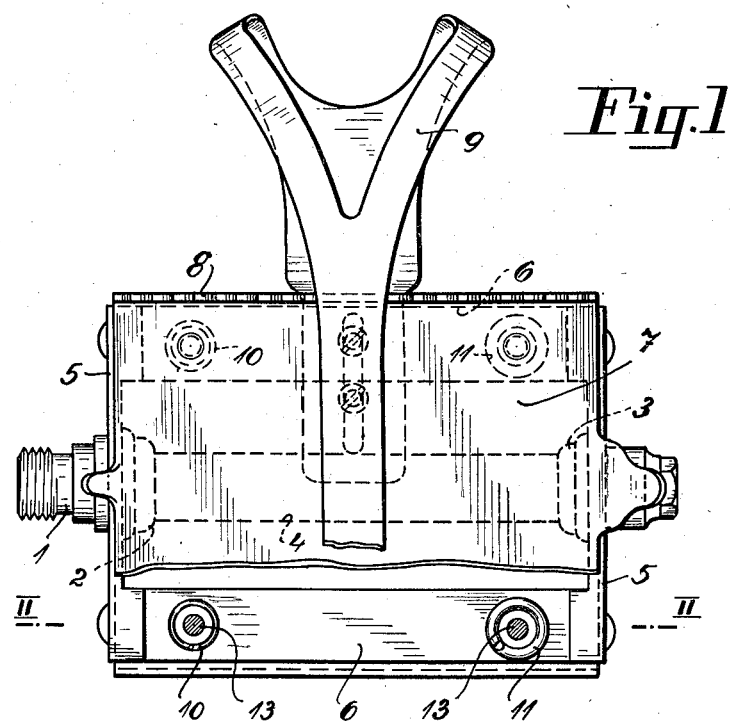
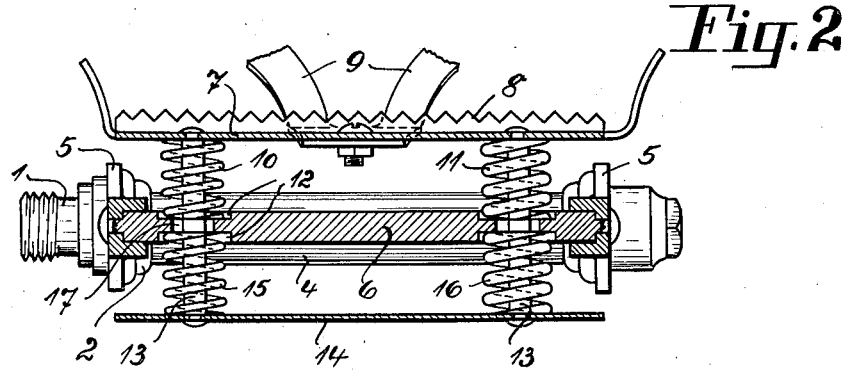
Inventor:
Johannes Baron
by Dec. 17, 1935.   J. BARON   2,024,499
BICYCLE PEDAL
Filed April 12, 1934   2 Sheets-Sheet 2

Inventor:
Johannes Baron

Patented Dec. 17, 1935

2,024,499

UNITED STATES PATENT OFFICE 2,024,499

BICYCLE PEDAL

Johannes Baron, Mehlem-on-the-Rhine, Germany

Application April 12, 1934, Serial No. 720,321
In Germany April 13, 1933

8 Claims. (Cl. 208—70)

The invention is concerned with bicycle pedals of the type having a sprung footplate. More particularly the invention is concerned with pedals in which, on the member rotatably mounted on the pedal spindle, there are provided parts which, acting against the tension of helical springs, move with respect to said member and in a direction transverse to its axis of rotation, and which carry the tread surfaces against which the foot is applied.

Between the bridge members carrying these tread surfaces and the body of the pedal mounted rotatably on the spindle, there are interposed helical springs through which the driving power of the foot is transmitted to the pedal crank. In the cycle pedals of this kind known heretofore, there are provided at each side of a middle plane passing through the pedal axis, two separate bridge members which move against pairs of springs and whose movement on the pedal frame member must be transmitted through guide bolts. In this case, on account of the sliding resistance in the guides of the bridge member, which resistance is subject to the influence of sand and dirt, the springing of these bridge members is considerably diminished and rendered practically ineffectual.

The object of the invention is a cycle pedal provided with internal springing of this kind and wherein instead of two separate bridge members on each pedal, only one bridge member moving transverse to the pedal frame axis is provided, this being supported by pairs of springs arranged along parallel planes at each side of the pedal spindle. Thus all means for a slidable guiding of the bridge member with respect to the pedal frame are dispensed with.

In particular, the invention also extends to cycle pedals of this kind in which the bridge member is connected with the pedal frame exclusively by two sets of helical springs which are mounted under equal initial tension in pairs, coaxially between fixed supporting faces of the pedal frame and opposite faces of the bridge member.

In the drawings,

Fig. 1 gives a plan view, partly in horizontal section of a pedal provided with a toe clip, that is, intended to be used at one side only, Fig. 2 gives a section on line II—II of Fig. 1.

Figure 3:
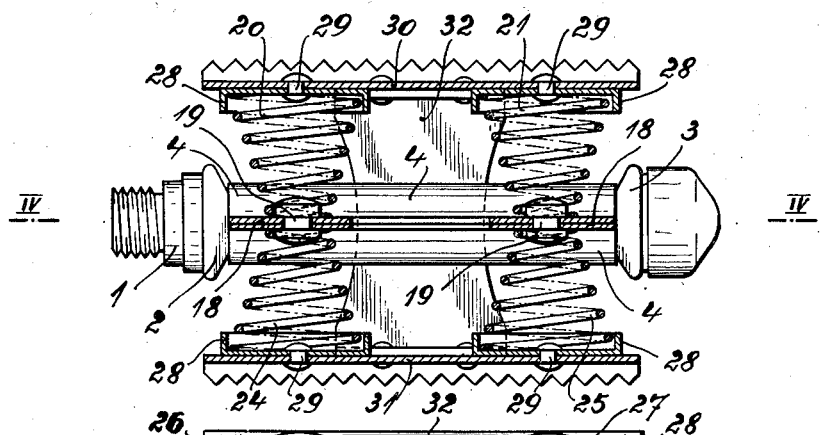
Fig. 3 illustrates a similar vertical section of another type of pedal.

On the pedal spindle 1, the frame member of the pedal is mounted as usual by means of two ball bearings, whose bearing sockets 2, 3 are connected together by means of a tubular sleeve 4 which is co-axial with the pedal spindle. The two bearing sockets carry side portions 5, which are connected by flat longitudinal bars 6. These together with the side portions, the tubular sleeve and the bearing sockets form the body of the pedal rotatably mounted on the spindle. Parallel to the face of the two longitudinal bars 6, there is arranged the bridge member or step 7, for example a rectangular plate, which is provided for instance at each of its two longitudinal edges with a series of serrations 8, to hold the foot in longitudinal direction and is equipped at one edge with a toe clip secured to the bottom of this plate.

The step or bridge member rests near each of its ends on a pair of helical springs 10, 11 each of which have their bottom ends resting in one of the centering recesses 12 on the two longitudinal bars 6. The plate member of the step is connected at each of its four corners through pins 13, to a companion plate 14 which is mounted at the other side of the pedal frame for example at the same distance as the step plate 7, through four companion springs 15, 16 whose elastic force and initial tension are just as great as those corresponding to the springs 10 and 11, which concentrically surround the same fixing pin. These pins each pass through the longitudinal bar members 6 through a hole 17 concentric with the centering recesses 12, the holes being of such a size that all contact with the sides of the holes is avoided when the step or bridge member carries out its spring movement.

By a suitable choice of the length of the unstretched springs on the one hand, and the fixing pins on the other hand, the initial mutually compensating tensions of the various springs may be appropriately proportioned. The thickness of the wire of the outside pair of springs, i. e. the pair lying farthest from the attachment side of the pedal, is somewhat greater so as to compensate for the greater pressure from the foot, which experience shows is at the outside. A more intense action may also be given to the outer supporting springs of the pedal by keeping the thickness of the wire the same but making the diameter of the outside springs less than that of the inside springs or, with the thickness of wire the same, making the number of spring convolutions and the unstretched length of the outer springs correspondingly greater than that of the inside springs.

Figure 4:
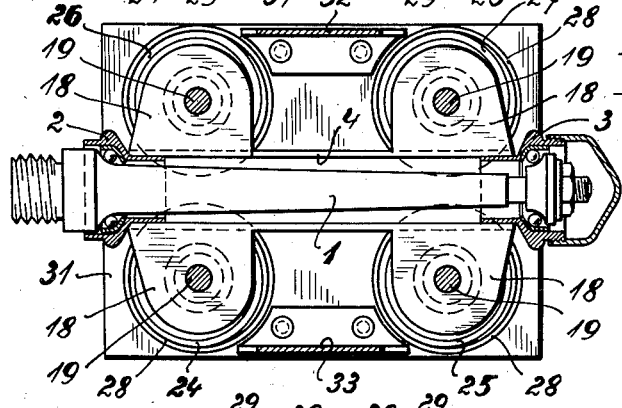
Fig. 4 is a horizontal section on line IV—IV of Fig. 3.
Figure 5:
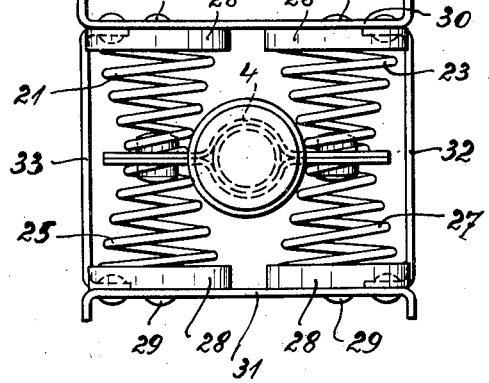
Fig. 5 is a transverse section on line V—V of Fig. 3.

In the arrangement of the cycle pedal shown in Figs. 3–5, the two ends of the pedal frame mounted on the pedal spindle are not furnished with the side portions 5 as are usually provided and as are shown in Figs. 1 and 2, connected by longitudinal bars 6. Instead of this, the tubular sleeve 4 connecting the two ball bearing bushes 2, 3 is formed of two longitudinally divided half-portions which are provided at their longitudinal edges with pairs of supporting wings 18, bent out in a common plane and which are connected together by means of rivets 19 passing through these wings. These supporting wings form the support for the inner, closely wound ends of each co-axially arranged pair of the eight helical springs 20, 21, 22, 23, 24, 25, 26, 27 whose convolutions expand conically outwards. The outer ends of these tapering helical springs are each received by a shallow cup 28, of which there are four secured, for example by means of rivets 29, to the inside of each of two step plates 30, 31. At the outside these step plates are provided at the longitudinal edges with serrated strips or given a suitable tread surface by covering with rubber.

The two step plates are connected together at both of their longer sides by transverse bars 32, 33 to form a rigid bridge structure which encloses the helical springs 20–27 like a cage. The conical arrangement of the spring convolutions makes it possible for them to fit into each other more or less, when they are compressed so that, as compared with helical springs of constant diameter, an increase of the effective stroke of this spring is obtained.

Just as in the foregoing example, the coaxial pairs of springs which are interposed between their supporting faces with initial tension, mutually keep each other under pressure and keep the pedal bridge in the middle position when there is no load on the pedal. Thus all rattling of the movable parts is precluded. The resilient character given by the initial tension ensures—in contrast to arrangements where the initial tension is produced by rigid limiting stops—a soft, elastic flexibility, yielding to the slightest load. Thus the fatigue-reducing effect of the pedal springs is considerably improved.

I claim:

1. In a bicycle pedal, in movable association with a pedal frame member mounted directly on the pedal spindle, a step plate externally provided with tread surfaces, supporting points on said pedal frame member, disposed in pairs at each side of the pedal spindle, four helical springs arranged between said supporting points and said step plate, a second step plate arranged at the opposite side of the pedal frame and parallel to the first step plate, the second step plate being rigidly combined with the first step plate to form a jointly movable bridge structure.

2. In a bicycle pedal, in movable association with a pedal frame member mounted directly on the pedal spindle, a step plate externally provided with tread surfaces, supporting points on said pedal frame member, disposed in pairs at each side of the pedal spindle, four helical springs arranged between said supporting points and said step plate, a second step plate arranged at the opposite side of the pedal frame and parallel to the first step plate, the second step plate being rigidly combined with the first step plate to form a jointly movable bridge structure, and two pairs of helical springs arranged in pairs at both sides of the pedal spindle between the second step plate and said pedal frame.

3. In a bicycle pedal, in movable association with a pedal frame member mounted directly on the pedal spindle, a step plate externally provided with tread surfaces, supporting points on said pedal frame members, disposed in pairs at each side of the pedal spindle, four helical springs arranged between said supporting points and said step plate, a second step plate arranged at the opposite side of the pedal frame and parallel to the first step plate, the second step plate being rigidly combined with the first step plate to form a jointly movable bridge structure and two pairs of helical springs arranged in pairs at both sides of the pedal axis between the second step plate and said pedal frame, these springs being opposite and co-axial to each of the four first-mentioned helical springs.

4. In a bicycle pedal, in movable association with a pedal frame member mounted directly on the pedal spindle, a step plate externally provided with tread surfaces, supporting points on said pedal frame members, disposed in pairs at each side of the pedal spindle, four helical springs arranged between said supporting points and said step plate, a second step plate arranged at the opposite side of the pedal frame and parallel to the first step plate, the second step plate being rigidly combined with the first step plate to form a jointly movable bridge structure and two pairs of helical springs arranged in pairs at both sides of the pedal axis between the second step plate and said pedal frame, these springs being opposite and co-axial to each of the four first-mentioned helical springs, and interposed with opposite initial tension to the latter, between the step plates and the pedal frame.

5. In a bicycle pedal, in movable association with a pedal frame member mounted directly on the pedal spindle, a step plate externally provided with tread surfaces, supporting wings on said pedal frame member, disposed in pairs at each side of the pedal spindle, four tapering helical springs unrestrained transversely or axially between their ends arranged between said supporting wings and said step plate, a second step plate arranged at the opposite side of the pedal frame and parallel to the first step plate, the second step plate being rigidly secured to the first step plate to form a jointly movable bridge structure, and two pairs of tapering helical springs being arranged in pairs at both sides of the pedal spindle between the second step plate and said pedal frame.

6. In a bicycle pedal in movable association with a pedal frame member mounted directly on the pedal spindle, a step plate externally provided with tread surfaces, supporting wings on said pedal frame members, disposed in pairs at each side of the pedal spindle, four tapering helical springs unrestrained transversely or axially between their ends arranged between said supporting wings and said step plate, a second step plate arranged at the opposite side of the pedal frame and parallel to the first step plate, the second step plate being rigidly secured to the first step plate to form a jointly movable bridge structure and two pairs of tapering helical springs being arranged in pairs at both sides of the pedal axis between the second step plate and said pedal frame, these springs being opposite and co-axial to each of the four first-mentioned tapering helical springs.

7. In a bicycle pedal, in movable association with a pedal frame member mounted directly on the pedal spindle, a step plate externally provided with tread surfaces, supporting wings on said pedal frame members, disposed in pairs at each side of the pedal spindle, four helical springs arranged between said supporting wings and said step plate, a second step plate arranged at the opposite side of the pedal frame and parallel to the first step plate, the second step plate being rigidly secured by four parallel pins with the first step plate to form a jointly movable bridge structure and two pairs of helical springs arranged in pairs at both sides of the pedal axis between the second step plate and said pedal frame, these springs being opposite and co-axial to each of the four first-mentioned helical springs and to said four parallel pins.

8. In a bicycle pedal, in movable association with a pedal frame member mounted directly on the pedal spindle, a step plate externally provided with tread surfaces, supporting wings on said pedal frame members, disposed in pairs at each side of the pedal spindle, four helical springs arranged between said supporting wings and said step plate, a second step plate arranged at the opposite side of the pedal frame and parallel to the first step plate, the second step plate being rigidly connected by two parallel bars with the first step plate to form a jointly movable bridge structure and two pairs of helical springs arranged in pairs at both sides of the pedal axis between the second step plate and said pedal frame, these springs being opposite and co-axial to each of the four first-mentioned helical springs.

JOHANNES BARON.